United States Patent [19]
Landfors et al.

[11] Patent Number: 5,653,861
[45] Date of Patent: Aug. 5, 1997

[54] ELECTROCHEMICAL PROCESS

[75] Inventors: Johan Landfors; Bo Håkansson, both of Sundsvall, Sweden

[73] Assignee: Eka Nobel AB, Bohus, Sweden

[21] Appl. No.: 627,290

[22] Filed: Apr. 4, 1996

Related U.S. Application Data

[60] Provisional application No. 60/000,329, Jun. 19, 1995.

[30] Foreign Application Priority Data

Apr. 6, 1995 [SE] Sweden ................................ 9501287

[51] Int. Cl.$^6$ ........................................................ C02F 1/461
[52] U.S. Cl. ........................... 205/746; 205/758; 205/759; 205/770; 205/494
[58] Field of Search ................................ 205/746, 758, 205/759, 770, 494

[56] References Cited

U.S. PATENT DOCUMENTS

| | | | |
|---|---|---|---|
| 4,337,126 | 6/1982 | Gilligan, III et al. | 205/510 |
| 5,391,267 | 2/1995 | Zoppi | 205/510 |
| 5,415,751 | 5/1995 | Adachi et al. | 204/182.4 |

FOREIGN PATENT DOCUMENTS

| | | |
|---|---|---|
| 9302682 | 8/1992 | Sweden. |
| WO94/12720 | 6/1994 | WIPO. |
| WO95/00701 | 1/1995 | WIPO. |

OTHER PUBLICATIONS

"Some Ideas on Polysulfide Pulping", Emil Venemark, Nr 5, Mar. 15, 1964, pp. 157–166.

*Primary Examiner*—Arun S. Phasge
*Attorney, Agent, or Firm*—Burns, Doane, Swecker & Mathis, L.L.P.

[57] ABSTRACT

The invention relates to a method of producing pulp comprising a step of forming green liquor containing alkali metal sulfide and alkali metal carbonate. The method further comprises a step of electrochemically treating the green liquor to oxidize at least part of the sulfide therein.

10 Claims, 2 Drawing Sheets

ELECTROCHEMICAL PROCESS

This application claims the benefit of U.S. provisional application Ser. No. 60/000,329, filed Jun. 19, 1995.

The present invention relates to a method of producing pulp comprising electrochemical treatment of green liquor to oxidize sulfide therein.

Production of pulp normally involves recovery of the cooking chemicals. In alkaline cooking, particularly in the sulfate process, black liquor from the cooking is concentrated by evaporation, combusted in a recovery boiler in which a great deal of the sulfur and the sodium are recovered in the form of green liquor mainly consisting of sodium carbonate and sodium sulfide. The green liquor is transformed to white liquor by treatment with slaked lime (causticizing) involving formation of sodium hydroxide and precipitation of calcium carbonate. The white liquor is then used for cooking the wood in the digester.

Green liquor can also be obtained by combustion of bleaching effluents.

It has been disclosed by E. Venemark, "Some Ideas on Polysulfide Pulping", Svensk Papperstidning No. 5, 15 Mar. 1964, that the yield of wood from alkaline pulp cooking can be improved if the white liquor contains polysulfides.

WO 95/00701 describes electrochemical treatment of white liquor involving oxidation of sulfides to polysulfides as well as production of alkali metal hydroxide.

WO 94/12720 discloses that sodium hydroxide can be produced by electrolysis of green liquor obtained from combustion of bleaching effluents. However, it is stated that any sulfide present in the green liquor should be oxidized with air before the electrolyses. Thus, the process does neither involve electrochemical oxidation of sulfide nor formation of polysulfides.

The object of the present invention is to provide an improved method of producing cellulose pulp involving electrochemical treatment of cooking liquors to oxidize sulfide. It is another object to provide an efficient process producing alkali metal hydroxide from raw materials available at a pulp mill. It is still another object to provide an improved method of obtaining cooking liquor containing polysulfides. It is still another object to provide a method of obtaining sulfide free liquors for use in a pulp mill.

The invention concerns a method of producing pulp comprising a step of forming green liquor containing alkali metal sulfide and alkali metal carbonate. The method further comprises a step of electrochemically treating the green liquor to oxidize at least a part of the sulfide therein, preferably by operating an electrochemical cell comprising at least two compartments with the green liquor as anolyte. Suitably, the electrochemical treatment also comprises production of alkali metal hydroxide, preferably by operating an electrochemical cell comprising at least two compartments with water or aqueous alkali metal hydroxide as catholyte.

Normally, green liquor is obtained in processes for alkaline cooking of cellulose pulp, for instance sulfate pulp or kraft pulp. The green liquor to be treated can be obtained by thermal treatment of cooking effluents, normally in a recovery boiler in which concentrated black liquor is combusted in reducing atmosphere. However, the green liquor can also be obtained by thermal treatment of bleaching effluents, which treatment may involve concentration and combustion as described in the already mentioned WO 94/12720. The main constituents of green liquor normally are carbonate, sulfide and hydroxide of alkali metals, the concentrations of which may be from 0 to saturation.

Typically, green liquor obtained from cooking effluents contains from about 0.2 to about 3 moles/litre, preferably from about 0.5 to about 1.5 moles/litre, of alkali metal carbonate, from 0 to about 2 moles/litre, preferably from 0 to about 1 mole/litre of alkali metal sulfide, from 0 to about 2 moles/litre, preferably from 0 to about 1 mole/litre of alkali metal hydroxide, and from 0 to about 0.3 moles/litre of alkali metal chloride. Green liquor obtained from bleaching effluents generally have a similar composition, but the sulfide content is normally within the lower area of the specified range. The alkali metal is normally sodium, potassium or a mixture thereof. In a typical system, from about 90 to about 97% of the alkali metal ions are sodium, the remainder essentially being potassium. However, there might also be systems essentially based on potassium and containing very small amounts of sodium.

In a preferred embodiment the green liquor is treated in an electrochemical cell comprising separate anode and cathode compartments separated by a partially permeable barrier, preferably a cation selective membrane. The preferred treatment comprises the steps of introducing green liquor into the anode compartment, introducing water and preferably alkali metal hydroxide into the cathode compartment, electrochemically oxidizing sulfide in the anode compartment, forming hydroxide ions in the cathode compartment, and passing alkali metal ions from the anode compartment to the cathode compartment.

Preferably, the anode potential is so maintained that the oxidation product substantially consists of polysulfides, i.e. $S_2^{2-}$, $S_3^{2-}$, $S_4^{2-}$ and $S_5^{2-}$, and so forth. The exact limits of the anode potential depend on the magnitude of the over voltage. Normally, however, the anode potential is suitably maintained in a range of from about −0.6 V, which is the theoretical lower limit enabling the formation of polysulfide, to the level at which oxygen begins to develop, normally at about +0.6 V. Preferably, the anode potential is maintained in a range of from about −0.6 V to about +0.5 V, in particular in a range of from about −0.2 V to about +0.4 V. By keeping the anode potential somewhat higher, but preferably still below the potential for oxygen formation, the oxidation of sulfide essentially yields sulfate and/or thiosulfate. By keeping the anode potential within the specified limits, it is also possible to substantially avoid formation of chlorine.

The cathode potential is preferably so maintained that, apart from hydroxide ions, mainly hydrogen gas forms, which in practice normally takes place in a range of from about −0.9 V to about −1.2 V. The hydrogen gas formed can be used as an environment-friendly source of energy or as raw material in other chemical processes. In another mode of operation, the cathode potential is maintained in a range of from about +0.3 V to about −0.9 V, while at the same time oxygen-containing gas, for example, air, is supplied to a cathode in the form of a gas-diffusion electrode, resulting in the reduction of oxygen and the formation of hydrogen peroxide and/or hydroxide ions. In the presence of oxygen, it is also possible to have the cell operate as a fuel cell, resulting in the generation of electric power.

All figures indicating electrode potentials, anode as well as cathode potentials, represent the potentials measured against a reference electrode of Hg/HgO in 1M NaOH at 25° C. The limits cannot be set at exact values, since the result at a certain potential depends on the magnitude of the over voltage in each particular case.

The green liquor introduced into the anode compartment may have a degree of recycling from 0 to almost 100%. The recycled green liquor, if any, may contain from about 0.2 mol to about 1.5 mol of sulfide per litre, preferably from about 1 mol to about 1.5 mol of sulfide per litre. For instance, the conversion of sulfides may be from about 0.5% to 100%. Preferably, the solution introduced into the cathode compartment essentially consists of water and alkali metal hydroxide, especially hydroxide of sodium, potassium or mixtures thereof. The concentration of alkali metal hydroxide is not critical, and may, for example, be from about 0.1 mol/l to about 15 mol/l, preferably from about 1 mol/l to about 10 mol/l. The upper limit for what is regarded as suitable is generally determined by the properties of the barrier separating the anode and cathode compartments, since too much leakage of hydroxide ions through the barrier reduces the current efficiency.

In order to fully use the electrolytic cell, the process is preferably carried out at a current density exceeding about 0.5 kA/m$^2$, in particular exceeding about 2 kA/m$^2$. At excessive current densities, the anode is increasingly worn, and the risk of undesirable by-products such as oxygen is increased. If polysulfides are the desired main product, it is also desired to avoid formation of sulfate and thiosulfate. Normally, a current density not exceeding about 20 kA/m$^2$, in particular not exceeding about 15 kA/m$^2$, is preferred. The formation of by-products is also reduced by keeping the temperature of the anode compartment sufficiently high, suitably in a range of from about 60° C. to boiling point, which usually is about 110°–120° C. In practice, the upper temperature limit depends on the material of the cell, especially when the barrier is made of a polymer-based membrane, for which reason the especially preferred temperature ranges from about 80° C. to about 100° C. For practical reasons, the temperature of the cathode compartment is preferably substantially equal to that of the anode compartment. Also, it has been found that the amount of by-products is reduced if the anolyte flow is sufficiently high. Preferably, the flow in the anode compartment is turbulent, and suitably the average linear velocity is higher than about 0.5 m/s. The catholyte flow is not critical and is, in actual practice, conveniently determined by the size of the lifting force of the generated gas. Otherwise, pumps may be used.

It has been found that the precipitation of sulfur on the anode can be avoided by the choice of a suitable material. Without preference to any specific theory, it is assumed that the oxidation of sulfide involves an intermediary stage in which atomic sulfur is bound to the anode surface. If this bond is too strong, the sulfur will not react further, and some of the sulfur will remain on the anode surface and there form a passivating surface layer. According to the invention, use is advantageously made of an anode which is made of a carrier material of high alkali resistance, such as titanium, zirconium, hafnium, niobium and alloys thereof, or carbon, nickel or nickel alloys, the carrier material being surface-coated with one or more oxides of ruthenium, iridium, platinum and palladium. Electrodes made of suitable material and having a suitable surface coating are commercially available, such as the so-called DSA® electrodes (dimensionally stable anode). It has been found that DSA® electrodes designed for oxygen or chlorine-gas generation are suited for use in the invention, such as those electrodes marketed under the designations ON 201, ON 120 and ON 101.

It is favourable if the anode has a large surface and that the sulfide transport to the entire surface functions well. Thus, the anode employed suitably is a three-dimensional through-flow electrode, such as a three-dimensional mesh electrode, balls of wire, layers of wire mats, particle beds or metal foam. It is especially preferred to use a three-dimensional mesh electrode composed of a plurality of layers of expanded metal, for example interconnected by spot welding.

The cathode material is not critical, and use can be made of such common alkali-resistant materials as steel, stainless steel, nickel and ruthenium-coated nickel. The cathode may consist of a flat plate, one or more layers of mesh, or a three-dimensional through-flow electrode similar to that used as anode. If oxygen-containing gas is to be blown into the cathode compartment, use should be made of an oxygen-reducing cathode, in which case a graphite-felt electrode is convenient. Such electrodes are commercially available and generally used, for example in fuel cells. The oxygen-reducing cathode may be coated with a catalyst, such as platinum, in order to increase the amount of hydroxide ions formed in relation to the amount of hydrogen peroxide. By oxygen-reduction, it is possible to produce an alkaline hydrogen peroxide solution which can be used as such for bleaching cellulose pulp. Also, the presence of hydrogen peroxide in the cathode compartment contributes to the resulting product being perfectly sulfide-free, since any sulfides leaking in from the anode compartment are at once oxidized by the peroxide to sulfate.

Preferably, use is made of a two-compartment cell with adjoining anode and cathode compartments, but cells having three or more compartments may also be used, in which case the green liquor may be introduced into the anode compartment as well as into one or more compartments located between the anode compartment and the cathode compartment. The barrier separating the compartments of the cell, normally found between the anode compartment and the cathode compartment, should let alkali metal cations from the anode compartment through to the cathode compartment, but should preferably to the greatest possible extent prevent the passage of sulfides and polysulfides and preferably that of other anions as well. Also hydroxide ions should preferably be prevented by the barrier, even if some may be permitted to pass. Preferably, use is made of a cation-selective membrane permeable to alkali metal cations but essentially impermeable to sulfides and polysulfides. If the cell has more than two compartments, different combinations of anion-selective and cation-selective membranes may be used for separating the different compartments of the cell. Furthermore, one or more porous diaphragm may be used as barriers, optionally in combination with one or more ion-selective membranes. Suitable membranes may, for instance, be made of perfluorinated, sulfonated or teflon-based polymers, or ceramics. Also polystyrene-based membranes or diaphragm of polymers or ceramics may be used. There are several commercially available membranes suitable for use, such as Nafion®.

A plurality of electrolytic cells can be arranged in bipolar as well as monopolar fashion.

The electrochemically treated green liquor can be transferred to a causticizing step in which slaked lime (calcium hydroxide) is added, converting the carbonate to hydroxide. If the green liquor contains polysulfides, these will be present in the resulting white liquor which then can be used in the cooking. If the green liquor is substantially free from sulfide and polysulfides, the liquor obtained from the causticizing can be used in the bleachery. The electrochemically treated green liquor can also be further treated electrochemically to remove carbonate in the form of carbon dioxide and simultaneously produce alkali metal hydroxide.

In a preferred mode of operating an alkaline pulp process, green liquor obtained from cooking effluents is so treated that its content of polysulfides is increased before it is supplied to the causticizing process. Then, the whole amount of green liquor can be treated at a low degree of conversion, for example ranging from about 0.5% to about 1%, based on the sulfide present in the green liquor, or a part flow can be treated at a higher degree of conversion, for example ranging from about 10% to 100%, preferably ranging from about 60% to about 95%, based on the sulfide present in the green liquor. The catholyte is conveniently recycled in a special circuit, a steady state being maintained by recovering a part flow as a product, which, for example, can be used in the cooking process or the bleaching process or be completely removed from the system of the pulp mill.

In another mode of operation, a partial flow of the green liquor is so treated that a large amount of the sulfides are converted to polysulfides, preferably about 70–100%, whereupon the polysulfides are converted to sulfur or some solid sulfur compound, for example by cooling crystallisation, and are removed from the system. This mode of operation is suited for use in mills where excessive amounts of sulfur compounds are supplied to the process along with the raw material. The catholyte may be treated as in the mode of operation described above.

In yet another mode of operation, a partial flow of the green liquor is so treated that the sulfides are oxidized to sulfate and/or thiosulfate. If so, the treated anolyte may be used as a substantially sulfide free liquor in the pulp mill, for example as a pH regulator in the bleachery. The substantially sulfide free green liquor may also be causticized with slaked lime to convert the carbonate to hydroxide and then be used in an oxygen delignification step or in alkaline bleaching steps. In another embodiment, the electrochemically treated and preferably substantially sulfide free green liquor is further treated electrochemically to remove carbonate in the form of carbon dioxide and simultaneously produce alkali metal hydroxide. Such treatment is preferably performed by mixing preferably substantially sulfide free green liquor with an acid aqueous anolyte, preferably containing sulfate, resulting in formation of carbon dioxide and an acid anolyte containing less carbonate then the original green liquor, removing carbon dioxide from the acid anolyte, introducing the acid anolyte into the anode compartment of an electrochemical cell, introducing water and preferably alkali metal hydroxide in the cathode compartment of said cell, electrochemically forming protons in the anolyte, electrochemically forming hydroxide ions in the catholyte, passing alkali metal ions from the anolyte to the catholyte through a separator, preferably a cation selective membrane, and mixing part of the acid enriched anolyte with new green liquor. Normally, also oxygen and/or chlorine forms in the anolyte, thus enabling removal of chloride from the green liquor.

The present invention enables of alkali on the basis of raw material available in pulp mills, without the formation of any undesirable by-products and without any need for pretreatment of the green liquor with oxygen or air. Thanks to the comparatively low anode potential required for sulfide oxidation, the alkali production is very energy effective. If the alkali metal hydroxide produced is not utilised in the closed part of the pulp process, it is also possible to reduce the risk of increasing potassium concentration, thus avoiding the problems that may arise in the soda recovery unit at excessive potassium contents. The yield of wood in the manufacture of pulp can be augmented by increasing the polysulfide content of the white liquor obtained by causticizing the treated green liquor. It is also possible to obtain substantially sulfide free liquors for use in the bleachery. Thus, through the invention green liquor obtained from cooking effluents can be treated to be useful in the bleachery and vice versa, depending on the material balance for the individual pulp mills. Since electrochemical treatment of green liquor normally also involves removal of alkali metal cations and some water, the load on the causticizing plant will be lower than if the corresponding treatment is performed on the white liquor. Another advantage of treating the green liquor is that calcium added in the causticizing decreases the lifetime of cell membranes.

BRIEF DESCRIPTION OF THE DRAWINGS

The invention will be described in more detail below with reference to the accompanying drawings, in which.

The invention is not restricted to the embodiments shown, but is defined by the scope of the appended claims.

Figure 1:
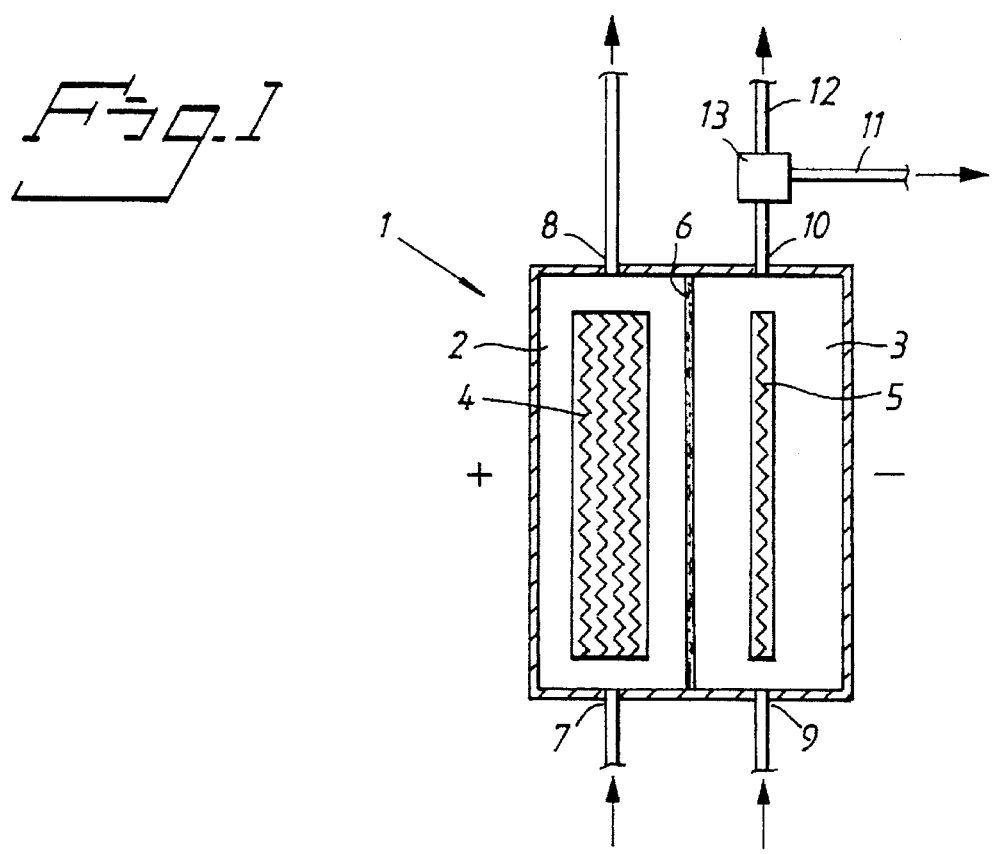
FIG. 1 is a schematic view of an electrolytic cell.

The electrolytic cell 1 illustrated in FIG. 1, comprises an anode compartment 2 provided with a three-dimensional through-flow electrode serving as an anode 4. A cathode compartment 3 provided with a preferably three-dimensional cathode 5 is separated from the anode compartment 2 by means of a cation-selective membrane 6. The anode 4 and the cathode 5 are connected to a direct-current source (not shown). The anode compartment 2 has an inlet 7 and an outlet 8 for the anolyte. The cathode compartment 3 has an inlet 9 and an outlet 10 for the catholyte and gaseous products, extending to a gas separator 13 which has an outlet 12 for gas and an outlet 11 for liquid. When the cell 1 is in operation, green liquor is introduced into the anode compartment 2 through the inlet 7. Thus, sulfides are oxidized to polysulfides, and alkali metal cations are transported through the membrane 6 into the cathode compartment 3. Polysulfide-concentrated green liquor is discharged through the outlet 8. An aqueous solution of alkali metal hydroxide is introduced into the cathode compartment 3 through the inlet 9, and water is decomposed into hydrogen gas and hydroxide ions. The hydrogen gas is, along with an aqueous solution concentrated with respect to alkali metal hydroxide, discharged through the outlet 10. In the gas separator 13, the hydrogen gas 12 is separated from the alkali metal hydroxide 11.

Figure 2A:
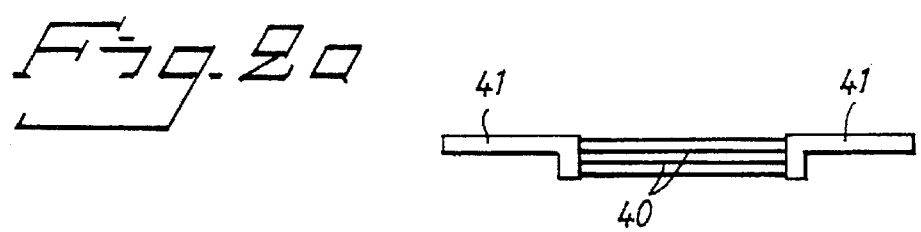
FIG. 2 is a view of a three-dimensional mesh electrode.
Figure 2B:
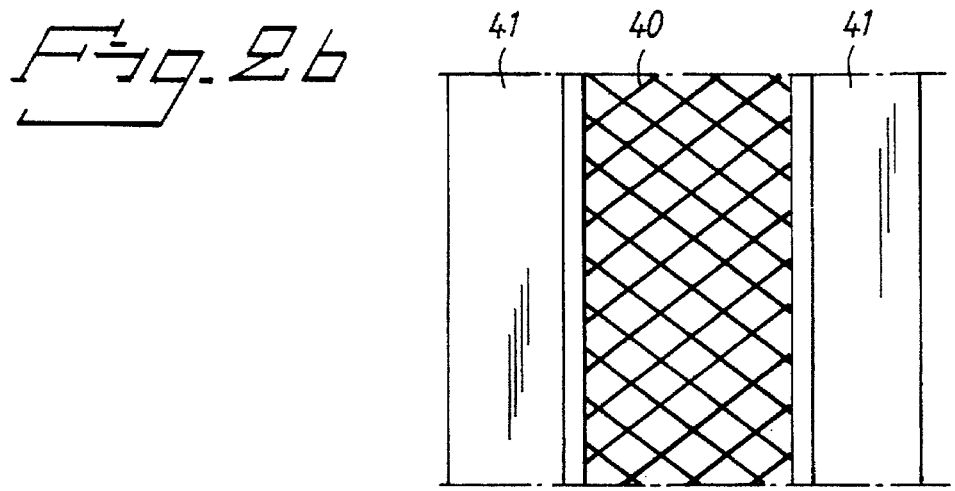

FIGS. 2a and 2b illustrate a three-dimensional mesh electrode from above and from the front, respectively. The illustrated electrode is composed of four nettings of expanded metal 40 which, by spot welding, are connected to a current supply in the form of metal strips 41.

Figure 3:
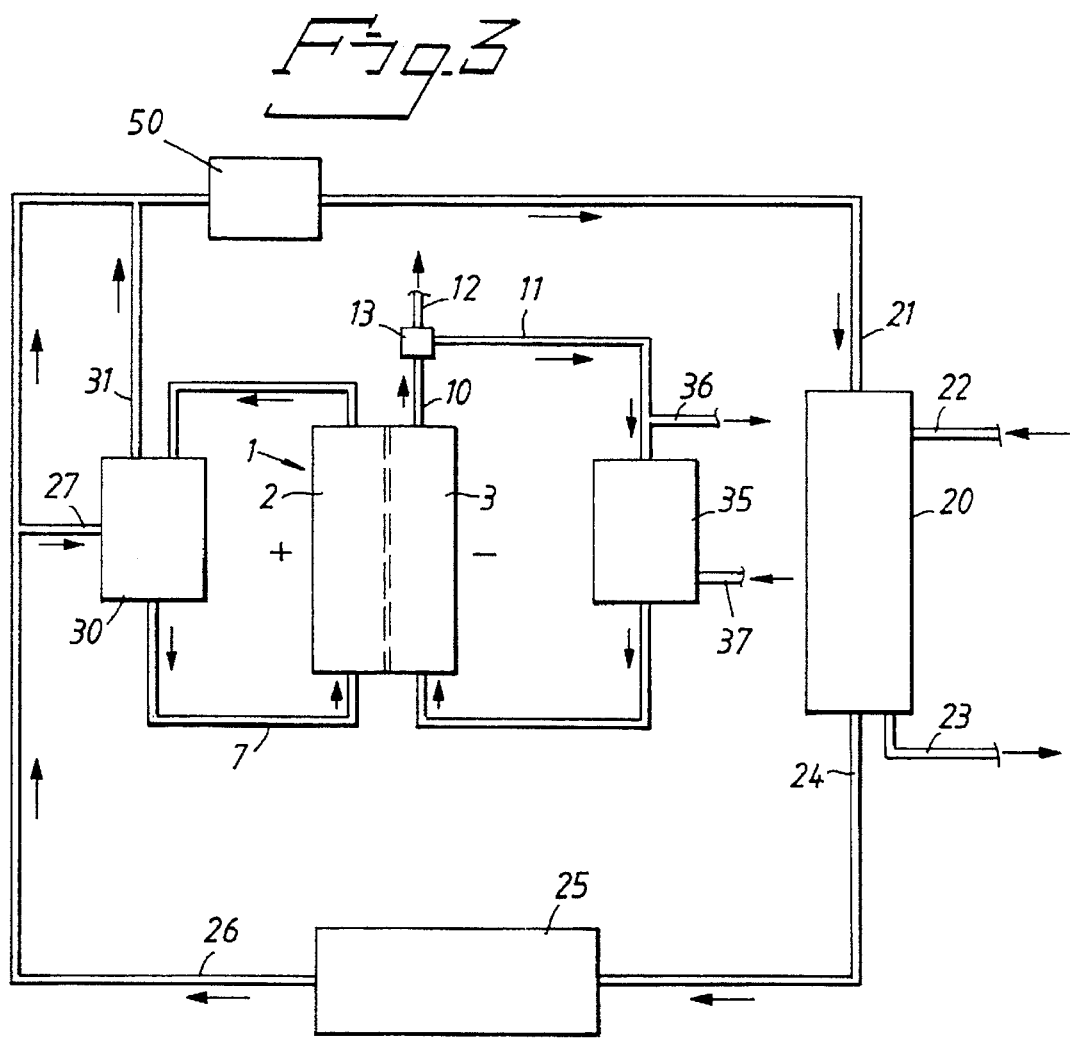
FIG. 3 is a schematic flow chart illustrating how the invention can be applied to the manufacture of cellulose pulp.

FIG. 3 illustrates how an electrolytic cell 1 of the type shown in FIG. 1 may be used for alkaline production of cellulose pulp, such as sulfate pulp. For reasons of clarity, only one cell 1 is shown, but it is obvious to those skilled in the art that any number of cells, for example from two to several hundreds, can be interconnected in parallel or in series. A preferred mode of operation will now be described. A digester 20 is supplied with white liquor 21, as well as wood and other chemicals 22 required, such as alkali metal hydroxide. Cooking and washing (not shown) result in pulp 23 and black liquor 24 undergoing different treatment stages 25 to obtain green liquor, which stages are well known among persons skilled in the art of pulp manufacture and normally include evaporation, addition of make-up chemicals, such as sodium sulfate, and combustion in reducing atmosphere. The treatment of the black liquor yields green liquor 26 which normally contains from 0 to about 0.4 mol/l of sulfides, from about 0.7 to about 1.2 mol/l of carbonate ions, from 0 to about 0.6 moles/litre of hydroxide ions, and from about 0.7 to about 2.5 mol/l of alkali metal cations, of which from about 90% to about 97% normally is sodium, the remainder essentially being potassium. Some of the green liquor 27, for example from about 1% to about 30%, is conducted to a tank 30 holding polysulfide-containing green liquor. Green liquor whose polysulfide-content increases in electrolysis, for example in such a manner that from about 65% to about 95% of the sulfide is converted to polysulfide, circulates between the tank 30 and the anode compartment 2 of the electrolytic cell 1. Polysulfide-rich green liquor 31 is drawn off from the tank 30 to be mixed with the main flow 26, such that the aimed-at polysulfide content is achieved, for example from about 0.5% by weight to about 1.5% by weight, whereupon the resulting mixture is supplied to a causticizer 50 in which slaked lime is added and white liquor 21 forms. The white liquor 21 is transferred to the digester 20 for cooking. An alkali metal hydroxide solution, for instance containing from about 2 mol to about 15 mol of alkali metal hydroxide per litre, circulates between the cathode compartment 3 of the cell 1 and a tank 35 via the gas separator 13. Some of the alkali metal hydroxide solution 11 from the gas separator 13 is drawn off as a product 36 and may, for example, be used in the manufacture of pulp, or in completely different processes. Water 37 is supplied to the tank 35, thereby to maintain the volume and the concentration essentially constant.

In a particular mode of operation, sulfur may be expelled from the system by carrying the sulfide oxidation to high contents of polysulfides in the tank 30, preferably to a conversion exceeding 70%, based on the sulfide in the green liquor. Green liquor from the tank 30 may then be so treated that sulfur is precipitated, for example through cooling crystallisation. This can be brought about by circulating polysulfide-rich green liquor between the tank 30 and a crystallizer (not shown) from which precipitated sulfur is removed, the mother liquor being recycled to the tank 30.

In another mode of operation, the sulfides in the green liquor are to a great extent oxidized to sulfate and/or thiosulfate, which can be performed by filling the tank 30 with green liquor, which then is circulated through the anode compartment 2, no green liquor leaving the circulation system until essentially the entire amount of sulfides has been converted to sulfate or thiosulfate. The resulting sulfate-rich, substantially sulfide-free green liquor may then be used in the pulp mill, particularly in the bleachery, optionally after causticizing or further electrochemical treatment to obtain alkali metal hydroxide.

The invention will now be further described through the following example.

EXAMPLE

The experiment was performed in a micro-flow cell consisting of an anode compartment and the cathode compartment separated by a Nafion®324 cation selective membrane. The anode was a DSA®ON201 mesh electrode and the cathode was a flat stainless steel electrode. The surface area of the membrane and the projected area of the electrodes was 10 $cm^2$. Synthetic green liquor consisting of an aqueous solution of 1.4M sodium carbonate and 1.275M sodium sulfide was used as the anolyte and 2.633M sodium hydroxide was used as the catholyte. 125 ml anolyte and 125 ml catholyte were placed in separate vessels and were then circulating through the cell with a flow of 160 ml/min. The voltage over the cell was about 1.3 V and the temperature was about 90° C. After 64 minutes the sodium hydroxide concentration in the catholyte was 2.8M and the sulfide concentration in the anolyte was 1.0M. The current efficiency for the hydroxide production was 60%.

We claim:

1. A method of producing pulp comprising a step of forming green liquor containing alkali metal sulfide and alkali metal carbonate, wherein the method further comprises a step of electrochemically treating the green liquor to oxidize at least part of the sulfide therein.

2. A method as claimed in claim 1, wherein the green liquor is treated by operating an electrochemical cell comprising at least two compartments with the green liquor as anolyte.

3. A method as claimed in claim 1, wherein the electrochemical treatment of the green liquor also comprises production of alkali metal hydroxide.

4. A method as claimed in claim 1, wherein the green liquor is treated in an electrochemical cell comprising separate anode and cathode compartments separated by a partially permeable barrier, the treatment comprising the steps of introducing green liquor in the anode compartment, introducing aqueous alkali metal hydroxide in the cathode compartment, electrochemically oxidizing sulfide in the anode compartment, forming hydroxide ions in the cathode compartment, and passing alkali metal ions from the anode compartment to the cathode compartment.

5. A method as claimed in claim 1, wherein the sulfide is oxidized to essentially yield polysulfides.

6. A method as claimed in claim 1, wherein the sulfide is oxidized to essentially yield sulfate and/or thiosulfate.

7. A method as claimed in claim 1, wherein the electrochemically treated green liquor is further treated electrochemically to remove carbonate in the form of carbon dioxide and simultaneously produce alkali metal hydroxide.

8. A method as claimed in claim 1, wherein green liquor obtained by thermal treatment of bleaching effluents is treated electrochemically to oxidize sulfide.

9. A method as claimed in claim 1, wherein green liquor obtained by thermal treatment of cooking effluents is treated electrochemically to oxidize sulfide.

10. A method as claimed in claim 1, wherein the electrochemically treated green liquor is transferred to a causticizing step.

* * * * *